(12) United States Patent
Setälä

(10) Patent No.: US 7,499,576 B2
(45) Date of Patent: Mar. 3, 2009

(54) METHOD AND SYSTEM FOR DETECTING A FIDUCIAL IN DIGITAL PROJECTION IMAGES

(75) Inventor: Henri Setälä, Järvenpää (FI)

(73) Assignee: PaloDEx Group Oy (FI)

( * ) Notice: Subject to any disclaimer, the term of this patent is extended or adjusted under 35 U.S.C. 154(b) by 844 days.

(21) Appl. No.: 10/876,799

(22) Filed: Jun. 25, 2004

(65) Prior Publication Data

US 2005/0129296 A1    Jun. 16, 2005

(30) Foreign Application Priority Data

Dec. 15, 2003    (FI) .................................. 20031835

(51) Int. Cl.
*G06K 9/00*    (2006.01)
(52) U.S. Cl. ........................... 382/128; 128/922; 378/4; 600/414
(58) Field of Classification Search ................. 382/100, 382/128, 129, 130, 131, 132, 133; 128/922; 378/4–27; 600/414, 426
See application file for complete search history.

(56) References Cited

U.S. PATENT DOCUMENTS

| 5,784,431 | A |   | 7/1998 | Kalend et al. |
| 5,898,797 | A | * | 4/1999 | Weiss et al. ................. 382/199 |
| 6,418,238 | B1 | * | 7/2002 | Shiratani et al. ............ 382/133 |
| 7,155,044 | B2 | * | 12/2006 | Vuylsteke ................... 382/128 |
| 7,187,789 | B2 | * | 3/2007 | Takeo ........................ 382/128 |
| 7,221,774 | B2 | * | 5/2007 | Fletcher ...................... 382/100 |

| 2002/0062075 | A1 | * | 5/2002 | Takeo ......................... 600/407 |

FOREIGN PATENT DOCUMENTS

| EP | 0 996 091 | | 4/2000 |
| EP | 1 324 259 | | 7/2003 |
| EP | 1324259 A1 | * | 7/2003 |
| WO | WO-02/01504 | | 1/2002 |

OTHER PUBLICATIONS

Circle Detection Based on Orientation Matching, Ceccarelli et al., IEEE 11th Int. Conf. on Image Analysis and Processing, Sep. 26-28, 2001, Palermo, Italy.
Extracting Facial Features by an Inhibitory Mechanism Based on Gradient Distributions, Lin et al., Pattern Recognition, vol. 29 (1996) 12, s. 2079-2101.

(Continued)

*Primary Examiner*—Bhavesh M Mehta
*Assistant Examiner*—Anand Bhatnagar
(74) *Attorney, Agent, or Firm*—Andrus, Sceales, Starke & Sawall, LLP (57) ABSTRACT

The invention relates to a method, system and computer software product for detecting a fiducial in digital projection images, particularly for detecting a fiducial in digital X-ray images automatically, without any operations required of the user. The invention for detecting the image of a fiducial positioned in a digital projection image is characterized in that for at least part of the digital projection image pixels, there is calculated a direction of the intensity gradient; there is defined a region of the projection image, on the basis of the directions of the intensity gradients, where the direction of the intensity gradient is changed according to predetermined limits; and there is defined a matching rate for how well the model describing the image of the predetermined fiducial matches the defined region.

32 Claims, 5 Drawing Sheets

OTHER PUBLICATIONS

Moment and Curvature Preserving Technique for Accurate Ellipse Boundary Detection, Janne Heikkilä, Proc. 14th Int'l. Conference on Pattern Recognition, Brisbane, Australia, p. 734-737.

Robust Tracking of Ellipse at Frame Rate, Pattern Recognition 34 (2002) p. 487-498.

* cited by examiner

METHOD AND SYSTEM FOR DETECTING A FIDUCIAL IN DIGITAL PROJECTION IMAGES

CROSS REFERENCE TO RELATED APPLICATION

The present application claims priority from Finnish Patent Application No. 20031835, filed Dec. 15, 2003.

BACKGROUND

The invention relates to a method and system for detecting a fiducial in digital projection images. In particular, the invention relates to a method, system and software product for automatically detecting a fiducial in digital X-ray images without any operations required of the user.

In the majority of medical imaging, the finding of certain locations in the image is particularly important, for instance in a situation where images are taken by various different methods, such as by X-ray, ultrasound and/or magnetic imaging equipment, and where a given anatomic spot of the patient, or a fiducial attached to the patient prior to the imaging process, must be located for example in order to mutually focus different images on the same spot, or in a situation where the operation is connected to a given anatomic spot, the location of which is otherwise difficult to distinguish in the image. It is also known to mutually focus images taken with the same modality but at different times. Fiducials can also be otherwise used for getting additional information of projection images, for example after the imaging operation proper, for instance in order to analyze imaging geometry, in order to track and compensate possible motions of the patient and/or in order to calculate a TACT reconstruction (Tuned Aperture Computed Tomography).

The use of artificial fiducials is prior art technology in medical imaging, where fiducials have typically been detected in an image by the manual "point-and-click" principle. The detection of various pointers, figures or patterns in an image represents prior art technology also as regard various machine vision applications. For example publication [1] illustrates an arrangement for detecting elliptical paths in an image by utilizing both the three first intensity moments of the image as well as the intensity gradient. In addition, publication [2] suggests a solution for tracking the contours of an ellipse in an image at the frame rate, for example by using visual pointers of the image (gradient and mode) as well as a RANSAC-type probability algorithm. In addition, among solutions of the prior art, it is known to search for a pattern of a given shape by calculating the correlation between the image and the model in order to find out whether an image according to the model is found in the image. Moreover, the performing of a Hough transformation in the parameter space of the image is also known for finding fiducials on the basis of their parameter representations, so that in the parameter space, there is summed up the space-function at the parameter values, and there are looked up the local maximum points of the parameter space, which maximum points correspond to the fiducials to be detected.

In arrangements that are used in prior art medical imaging, fiducials are typically detected manually, so that the user interactively points, for example by the computer mouse, at least approximately to the location of the fiducial, whereafter the fiducial is attempted to be found by means of the software, or as an alternative, the user indicates the location of the fiducial directly by visual estimation. However, the manual detection of fiducial locations is extremely slow, frustrating and susceptible to errors. In addition, the location accuracy of fiducials that are detected completely manually and only by visual estimation is extremely poor, and the variance is high. Moreover, as the user's attention is weakened, the accuracy in defining the locations of fiducials suffers remarkably, in which case fiducials may easily remain undetected in the image.

As regards prior art methods, software methods and others, for detecting fiducials, models or patterns, the problem is their slowness and inaccuracy. Particularly in a search process based on correlation, in case the fiducial image is for example partly covered, the correlation easily falls at a wrong point. Moreover, solutions according to the prior art are sensitive to the image noise. Prior art fiducial detection methods also are typical in that the user must in advance point that region in the image where fiducial images are supposed to be located, such as in the arrangement of publication [1]. In addition, in the solution of publication [2], one and the same target is tracked in successive images according to a two-step "detection and tracking" method, where the "detection" step utilizes a Kalman filter. However, in the solution of publication [2], the detection accuracy of the employed Kalman filter is not sufficient for surveying medical images.

SUMMARY

The object of the invention is to provide a solution for accurately and rapidly detecting fiducial images in digital projection images, particularly X-ray images, so that the above mentioned drawbacks can be alleviated. A particular object of the invention is to provide a solution by which the exact location and point of time of a fiducial image can be located in a projection image, even if the fiducial should in the image be at least partly covered by images of other objects, for example shadowed by bones and organs, in a case where the image contrast is weak, or when the gradient of the background is adverse. Moreover, the invention attempts at finding out how fiducials can be detected in an image accurately and efficiently, with a minimal processor power.

The objects of the invention are achieved so that at least for part of the projection image pixels, there is calculated the direction of the intensity gradient, and by means of the calculated directions of the intensity gradients, there is detected the region where the direction of the intensity gradient is changed according to predetermined limits, and there is defined a matching rate for how well the predetermined model matches the image of the detected region. In particular, the objects of the invention are achieved by calculating, for the directions of the intensity gradients, a rate of matching, such as correlation, on a predetermined curve, such as on a circle arch, and by comparing the calculated matching rates with a predetermined threshold value in order to select such a location in the projection image where the matching rate is sufficiently high, in order to suggest the location of the fiducial.

A method according to the invention for detecting in a digital projection image the image of a fiducial positioned in the target to be imaged is characterized in that the method comprises at least the following steps, where: for at least part of the digital pixels in the projection image, there is calculated the direction of the intensity gradient; on the basis of the calculated directions of the intensity gradients, there is defined a region in the projection image, where the direction of the intensity gradient is changed according to predetermined limits, and there is defined a matching rate for how well the predetermined model describing the fiducial image matches the defined region.

A system according to the invention for detecting in a digital projection image the image of a fiducial positioned in the target to be imaged is characterized in that the system is arranged to calculate, for at least part of the pixels in the digital projection image, the direction of the intensity gradient; to define on the basis of the directions of the calculated intensity gradients that region in the projection image where the direction of the intensity gradient is changed according to predetermined limits; and to define a matching rate for how well the predetermined model describing the image of the fiducial matches the defined region.

A computer software product according to the invention that is adapted to be directly loadable in the memory of a digital computer in order to be run is characterized in that said software product comprises computer software components for running the steps enlisted in claim 1, when said software product is run in a computer.

Preferred embodiments of the invention are described in the dependent claims.

The present application uses, among others, the following concepts:

A "detector" is an image recording device sensitive to the wavelength of the employed radiation, in which the image taken of the target and of the fiducial can be recorded. The detector can be for example a film, a CCD cell, a digital image plate or other similar media.

A "gradient" is a vector, the first component of which is direction, where the value of the first derivative is highest, and the second component of which is the magnitude of the first derivative in said direction. The intensity gradient vector is a vector that points towards the steepest climb in the intensity, the length of which is proportional to the local change in the intensity. In this document, there is generally used the term 'direction of the intensity gradient', when speaking of the direction of the intensity gradient vector.

A "fiducial" is an object with an advantageous geometry with respect to the imaging operation, and with an essentially higher thickness than the target to be imaged or the rest of the background; the fiducial is positioned in the object to be imaged, for instance on the surface of said object or inside it. For instance when imaging a human head, a fiducial can advantageously be for example a steel ball with a diameter of 2 mm, which ball absorbs well X-ray radiation and is thus well visible in a projection image, in addition to which it can be detected easily and accurately.

"Average filtering" here means filtering based on local averages.

"Median filtering" here means filtering based on local median values.

A "projection image" here means a two-dimensional image obtained for example by means of X-ray radiation of a three-dimensional target located in between the focus of the X-ray radiation source and the detector on film, CCD (Charge Coupled Device) cell, a digital image plate or other similar media, from where the image can be read in a digitally processable form preferably to a computer.

The method according to the invention is particularly meant for detecting images of fiducials in digital projection images, and particularly in digital X-ray images. According to a first preferred embodiment of the invention, fiducials that have an advantageous geometry from the point of view of the projection image to be taken are attached to the object to be imaged, such as to the patient, essentially immovably with respect to the target. In geometry, fiducials are typically spheres, but they may also be cubicles, cones, combinations of geometrical shapes or other advantageously three-dimensional objects that are easily distinguished from their background. In a projection image taken by X-ray equipment, a fiducial that is thicker than its background, for instance a steel sphere, is typically seen as a lighter area with an even edge, the shape of which the human eye can distinguish on nearly any background, depending on the illumination conditions. Fiducials, like structural features of other targets, are distinguished in the projection image, irrespective of the depth of the fiducial or other target in between the X-ray radiation source and the detector.

By means of the image of a fiducial, distinguished in the projection image, it is possible to accurately define at least the radial direction to the location where the fiducial was attached to the target to be imaged in an imaging situation, or the location of the fiducial in a two-dimensional projection image in relation to the imaged target. Further, on the basis of the location of the image of the fiducial defined in the projection image, there can be defined some other given location connected to the target, such as for example the location of an organ or another location that is essential in the interest of the project. Moreover, on the basis of the image of the fiducial, seen in the projection image, a possible moving of the target under imaging can be defined during the operation. When using several fiducials, the motion of the target can be calculated even in three dimensions, and the 3D geometry of the target in a single projection image can be defined by using several fiducials. For defining the geometry of a projection image, there are typically required 6 fiducials. In addition, the size of a fiducial in the detector can be utilized when estimating the location between the focus (X-ray source) and detector, when the real size of the fiducial is known.

A second preferred embodiment of the invention is characterized in that in a projection image, a fiducial is distinguished from the background and detected by making use of a feature where the direction of the intensity gradient at the edge of the fiducial located in the projection image is gradually changed when proceeding towards the centroid of the image of the fiducial, as the intensity gradient is very steep at the edges of the image of the fiducial, and towards the centroid of the image it becomes very gentle (particularly, when the fiducial is a steel sphere). Moreover, the direction of the intensity gradient is characterized in that a climbing gradient direction points towards the centroid of the image of the fiducial, when the fiducial is homogeneous and spherical in geometry. The invention is also characterized by the use of an algorithm for detecting the image of the fiducial in the projection image, where the algorithm is particularly based on analyzing the data collected in the vicinity of the edges of the image of the fiducial, especially in cases where on the background of the fiducial, there are not found objects that would have a shape and size too similar with the image of the fiducial.

As an alternative, according to a preferred embodiment of the invention, the detection of the image of a fiducial is only carried out on the basis of the intensity in the centroid of the image of the fiducial, based on the fact that the intensity. gradient is in the centroid of the fiducial image very even, which means that the high intensity in the centroid of the fiducial can be utilized for estimating the location of possible fiducials (in a location surpassing a given threshold value, there may be located a fiducial). Said alternative method is advantageously used particularly in a situation where the background of the fiducial is generally less opaque than the fiducial in the applied wavelength range.

According to a third preferred embodiment of the invention, the projection image is subjected to median filtering in order to eliminate noise. The noise contained by X-ray images is typically in the form of intensity spikes (Salt and Pepper noise), in which case the use of median filtering is particularly advantageous in order to eliminate this kind of noise, because median filtering does not essentially affect edges with a high contrast, for instance the edge of the image of the fiducial in the projection image. Also average filtering (for example with a gaussian kernel) can be applied, but it is not as good for eliminating noise of the above described type. After filtering, according to a preferred embodiment of the invention, the spatial resolution of the projection image is scaled to be coarser (i.e. the number of pixels in the projection image is artificially reduced), in order to reduce the number of pixels for which there is calculated the direction of the intensity gradient (and also magnitude according to a preferred embodiment), which would make the operation faster. It is pointed out that the direction of the intensity gradient can be calculated for all pixels, or as an alternative, according to a given method, there can be defined only part of the pixels for which the intensity is calculated. In addition, it is pointed out that the images of the fiducials can according to the present invention be detected, even if the resolution would be scaled to be coarser. However, a coarser resolution affects the detecting accuracy of the fiducials, as well as their detectability, which means that the initial resolution should be chosen carefully (not too coarse), in order to avoid loosing the locations of the images of potential fiducials.

After calculating the directions of the intensity gradients, there are, according to a preferred embodiment, looked up such regions in the projection image where the direction of the intensity gradient is evenly changed, for instance according to a predetermined model (correlation kernel). According to a preferred embodiment, for the regions found in this way, there is calculated a matching rate for measuring how well the model of the image of the fiducial matches the image of the found region, and in case the matching rate surpasses a predetermined matching rate, it can be presumed that an image of a fiducial is located in said region.

Next, according to a preferred embodiment of the invention, the resolution of the projection image is scaled finer (the number of the pixels existing in the projection image is increased to be nearer to the number of pixels of the original image). According to a fourth preferred embodiment of the invention, the direction of the intensity gradient is thereafter calculated only for pixels in a region where the image of a fiducial is supposed to exist on the basis of the preceding step. Thus the method is made especially rapid without weakening accuracy, because rejected regions, where fiducials are not supposed to exist, are not calculated anymore. However, the invention does not exclude the possibility that the direction of the intensity gradient should also be calculated for other pixels that can be defined according to some other method, or as an alternative, the direction of the intensity of some pixels could be left uncalculated.

However, the positioning of the fiducials in the target to be imaged causes some further problems, because even if we knew the real size of the fiducial, the size of the image of the fiducial may be changed in the projection image, depending on the distance of the fiducial from the focus and the detector. By means of the present invention, said problem can be eliminated by searching in the projection image an image of the fiducial by employing in the survey a model or kernel (template) with a size that is advantageously smaller than the size of the image of the fiducial in the projection image. The advantage of the invention lies in that in the region of the image of the fiducial, the direction of the intensity gradient is changed evenly, which is easily observed, even if only a given region having the size of said model (although being smaller than the image of the fiducial) should be surveyed in the image of the fiducial, and on the other hand in that in the region of the image of the fiducial, the direction of the intensity gradient points in all locations towards the centroid of the image of the fiducial.

According to a preferred embodiment of the invention, the direction of the intensity gradient (gradient vector) is for a single pixel in a projection image estimated on the basis of the surrounding pixels, by using two Prewitt filters with a 90-degree phase difference (both in the horizontal and in the vertical directions). However, it should be observed that the present invention is not restricted to the use this filter, but other similar filters can also be used in order to obtain a satisfactory result, according to the invention, such as for example a Sobel filter, or filters of the type LBP (Local Binary Pattern), FIR (finite impulse response), or IIR (infinite impulse response).

According to a fifth preferred embodiment of the invention, the. directions of the intensity gradient are calculated at least for chosen pixels within the range [0, 2π] most advantageously by means of a unit vector comprising two components, so that for each chosen pixel, there is calculated an x component and a y component, which are then scaled as a unit vector [Sqrt($x^2+y^2$)=1]. Said components can be obtained directly for instance as a result from a Prewitt or Sobel filter. In addition, the values of the obtained unit vector can be scaled to a gray shade image for example in the color space range [0, 255] or [0, 65 535], where two gray shade values correspond to one pixel of the original projection image, one of the gray shade values having a horizontal intensity gradient, and the other having a vertical gradient (x and y directions).

Next there is calculated, for the obtained gray shade image describing the direction of the intensity gradient, a similarity rate (matching rate or correlation) with a correlation kernel, for instance with a donut-shaped correlation kernel, for example by using a normalized correlation. According to a preferred embodiment of the invention, the employed correlation kernel is typically toroid-shaped, where the gray shade scale is evenly divided for instance between the values [0, 255] or [0, 65 535], starting from white and ending in black. However, the principle of the invention is not restricted to the use of a toroid-shaped correlation kernel only, but correlation kernels of many other shapes can also be used, such as for example circular, ellipsoidal or otherwise curve-shaped correlation kernels. Neither is the invention restricted to the use of gray shade images only, but the directions of the intensity gradients or the values of the unit vectors can also be scaled to another color space.

According to a sixth preferred embodiment of the invention, the correlation maximums are thereafter searched in the gray shade image describing the direction of the intensity gradient, advantageously on the basis of the mutual matching (correlation) between the correlation kernel, such as a toroid-shaped correlation kernel, and the gray shade image, so that the change in the shades of the correlation kernel is compared with those locations in the gray shade image that describe the direction of the intensity gradient. In case the matching rate (correlation) between the correlation kernel and a location in the gray shade image describing the direction of the intensity gradient surpasses a predetermined threshold value, at said location the correlation kernel matches the gray shade image, and it can be presumed that said location is the location of a fiducial.

According to a seventh preferred embodiment of the invention, the image resolution is increased, when a potential location for the image of the fiducial is found, and at least part of the preceding steps are repeated, but most advantageously only for those locations in the projection image where the location of the image of the fiducial is expected to be found. Processor power is thus saved, because there are not analyzed locations where fiducials are most probably not situated. On the other hand, the increasing of resolution leads in the profitable result that there can be used a higher threshold value, when the location of a potential fiducial is estimated, and what is more, with a higher resolution, the location of the found image of the fiducial in the projection image is detected extremely accurately, the error being typically ±0.5 pixels, particularly if there is chosen a pixel, the correlation of which is locally highest. However, a correlation surpassing the threshold value is almost always distributed in the region of several pixels, in which case the accuracy is remarkably improved, when there is calculated a weighted average point in the region where the correlation threshold is surpassed. As another alternative method, there can be used the inserting of a function, such as a parabolic function, and particularly a downwardly opening rotation paraboloid, in the correlation region, whereafter the maximum point of the inserted function is found out by calculatory methods. By observing these improvements, an accuracy of even 1/10 pixels can be achieved.

The present invention has remarkable advantages in comparison with the prior art solutions. By means of the method according to the invention, in a digital projection image, particularly in an X-ray image, fiducials can be identified automatically, without any operations required of the user, and the locations of the fiducials can be defined. In particular, the present invention also enables the detection of such fiducials that in the image are partly covered by images of other targets, for instance hidden behind bone structure or other thick tissue, in which case the direction or strength of the gradient of the fiducial intensity is in the image mixed with the background. In addition, the method according to the invention is reliable, extremely accurate (according to performed tests remarkably more accurate and more reliable than a detection process carried out manually by a person, even if the image would be zoomed out especially for the manual detection operation) and extremely fast, and moreover, the accuracy in the reproduction is excellent. In addition, the present invention enables the detecting of fiducials also in projection images that include large fluctuations in intensity, and where the contrast is very low. By means of the present invention, it is thus possible to decrease the patient's exposure to harmful X-ray radiation, because the need for taking new projection images is eliminated even further. Moreover, the efficiency and reliability in detecting fiducials in a projection image is made possible by the characteristic feature of the invention to utilize the direction of the intensity gradient, because especially in X-ray projection images, the direction of the intensity gradient inside the image of the fiducial can be calculated easily, efficiently and reliably.

DRAWINGS

The invention is explained in more detail below, with reference to the appended drawings, where.

DESCRIPTION

Figure 1A:
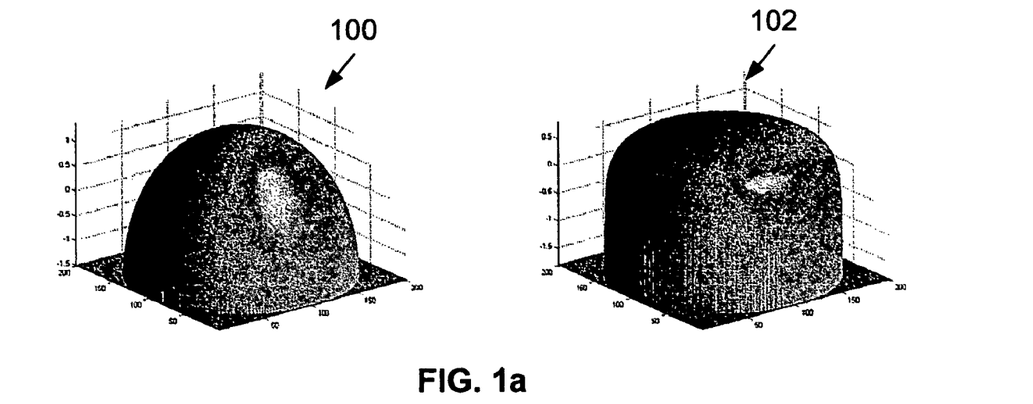
FIG. 1a illustrates the effect of one homogeneous, spherical fiducial on the X-ray intensity distribution in a projection image without background material, and with a thick background material.

FIG. 1a illustrates the absorption effect of one homogeneous and geometrically spherical fiducial on the intensity distribution of X-ray radiation in a projection image without background material 100, and with thick background material 102.

When using a spherical fiducial made of for example steel, the edge of the projection image of the fiducial is made extremely precise and easy to be detected. The strength of the X-ray radiation intensity at the detector depends logarithmically on the thickness of the homogeneous material located between the focus and the detector, and consequently the intensity of the projection image depends on the thickness of the material located on the background of the fiducial. Particularly in FIG. 1a, the steepness of the change in intensity at the edge of the image of the fiducial can be easily observed, as well as on the other hand the slightness in the change of intensity at the centroid (flat spot) of the image of the fiducial, particularly in a situation where on the fiducial background, there is during the imaging operation located thick background material, such as for instance in X-ray images taken of a human head and teeth. In addition, one clearly distinguishable feature in FIG. 1a is that the direction of the intensity gradient points towards the centroid of the image of the fiducial on all sides of the image.

Figure 1B:
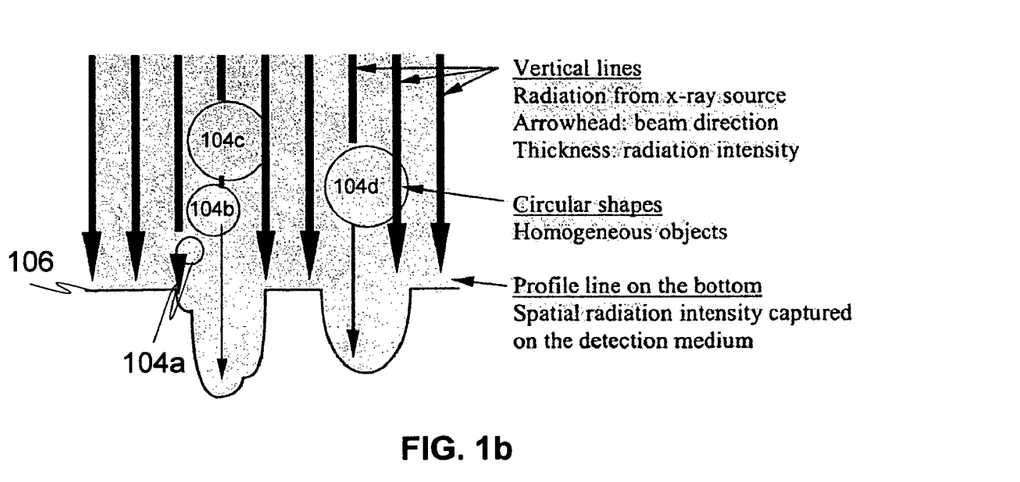
FIG. 1b illustrates the effect of several, partly overlapping, homogeneous spherical fiducials on the intensity of the X-ray radiation.

FIG. 1b illustrates the absorption effect of several, partly overlapping spherical fiducials 104a, 104b, 104c, 104d, made of the same homogeneous material on the X-ray radiation intensity. In FIG. 1b, the X-ray radiation is illustrated as emitted from above, and the line 106 describes the strength of the intensity at the detector. In FIG. 1b it can be seen how a fiducial 104a that is small in size absorbs remarkably less of the radiation than the bigger fiducials 104b and 104c. Moreover, FIG. 1b illustrates how several fiducials 104a-104c located on top of each other on the line between the focus and the detector each absorb a certain amount of radiation, which is seen in the intensity measured at the detector as various minimum points of intensity. Thus a projection image taken by means of penetrating radiation differs exactly in these features for instance from traditional photography, because here it is possible to detect an object located behind another object, whereas in traditional photography, of superimposed objects, there can only be seen the one that is positioned on top.

Figure 1C:
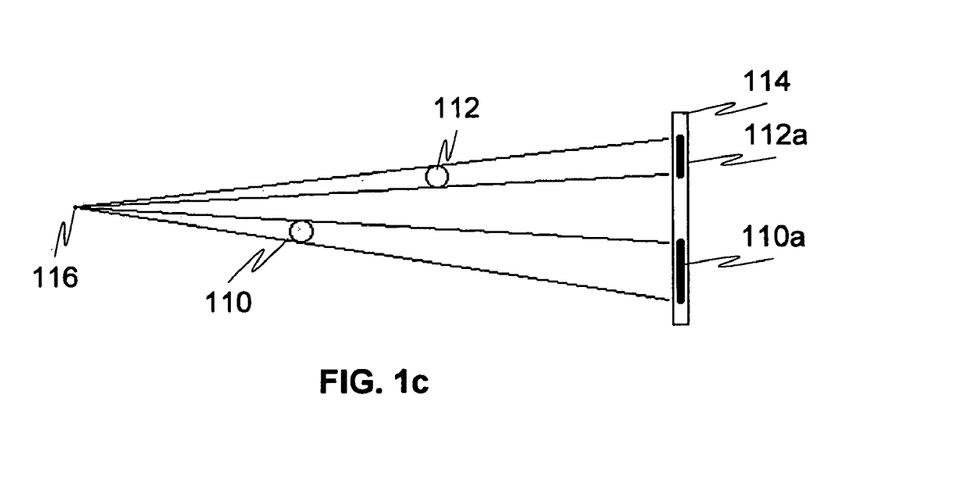
FIG. 1c illustrates an image of two identical, homogeneous spherical fiducials in a projection image, when the fiducials are positioned at different distances between the focus and the detector.

FIG. 1c illustrates the image 110a, 112a of two homogeneous spherical fiducials 110, 112 that are identical in geometry, size and material, in a projection image created in the detector 114, when the fiducials 110, 112 are located at different distances between the focus 116 and the detector 114. Thus it is advantageous to use in the imaging operation homogeneous fiducials made of the same material and having a similar geometry, such as steel balls, in which case on the basis of the size of the image of the fiducial detected by the detector, there can also be defined the location of the fiducial in the depth direction between the focus and the detector according to equation (1), $$s_d = \frac{f \cdot s_w}{d} \quad (1)$$

where $S_d$ is the size of the image of the fiducial on the detector, f is the focal distance, $S_W$ is the real size of the fiducial and d is the distance of the fiducial from the focus. In particular, there can be tracked the motion of the object to be imaged in the depth direction, by observing the change in the size of several fiducial images in different projection images. The size of a fiducial in a digital image can also be expressed as pixels by scaling the $S_d$ (size of the fiducial image on the detector) of the previous equation by a coefficient describing the pixel size on the detector. It is pointed out that the value of the distance parameter d changes depending on the imaging angle.

Figure 2:
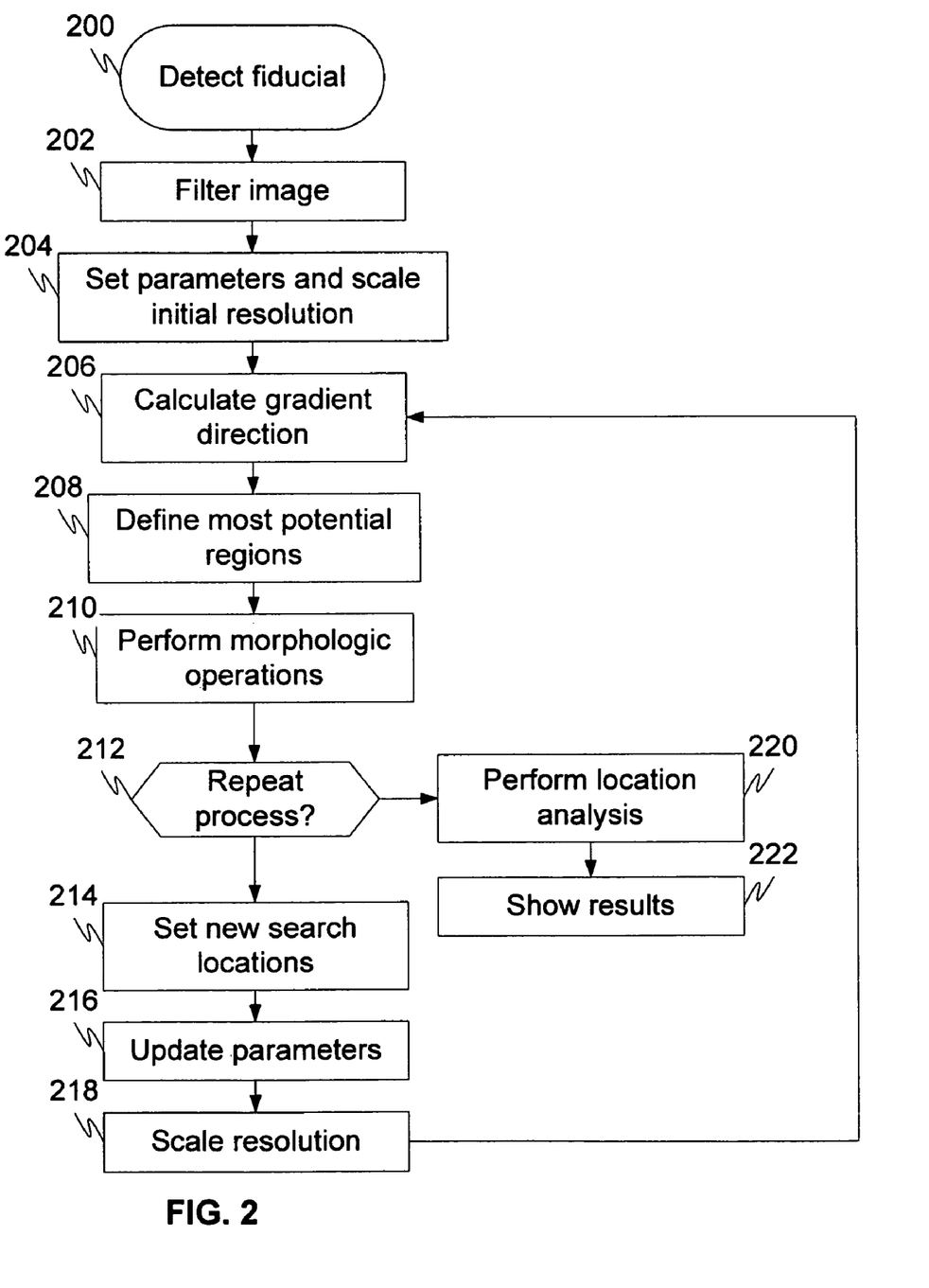
FIG. 2 is a block diagram illustrating, by way of example, a method for detecting the image of a fiducial in an X-ray projection image according to a preferred embodiment of the present invention.

FIG. 2 is a block diagram illustrating an exemplary method 200 according to the present invention for detecting an image of a fiducial in a projection image, in which method first in step 202, the projection image is filtered for minimizing the noise. The projection image obtained most advantageously by X-ray radiation is first processed by median filtering by means of a window having the size of for instance 5×5 for eliminating spike-like noise, whereafter it is possibly subjected to average filtering by means of a window having the size of for instance 3×3 for evening out the edges. However, the use of average filtering is optional.

Next in step 204, the parameter values are set, and the projection image resolution is scaled to be coarser prior to the processing proper of the projection image. Scaling here means decreasing the spatial resolution of the image, so that process power is saved in calculating the directions of the intensity gradients, because there are now remarkably less pixels for which a direction is calculated. The resolution is typically scaled to 25% of the original in the x and y directions, i.e. the data quantity is $(1/4)^2 = 6.25\%$. Thereafter the zoom out is altered in the successive process steps, advantageously in steps of integer powers of 2, i.e. $2^{-2}, 2^{-1}, 2^0$.

Parameter values are set, among others, for the following parameters: the employed correlation kernel (for example toroidal or circle arch), radius (initial radius, inside which the gradient magnitude is supposed to be maximal, often somewhat shorter than the radius of the fiducial), the number of the pixels to be calculated (number of the initial pixels, which are subjected to sampling by means of a correlation kernel having the shape of for instance of a circle arch or other closed or non-closed curve, such as two parallel lines of a given length, either ellipsoidal or toroid-shaped), the correlation threshold value (a given threshold value, the correlation surpassing said value being considered significant), the erosion parameter (a morphologic erosion operation that is used for eliminating small and false-appearing correlation spikes from the image on the basis that the correlation caused by a fiducial is higher), and the dilation parameter (a morphologic dilation operation that is used for improving correlation spikes that are small but still at least of a given magnitude, in order to ensure that these shall be analyzed later on). In practice the erosion operation is not necessary, because the gained advantage for instance to the calculation speed is only slight. Said morphologic operations (Erosion/Dilatation) can be carried out several times in succession, typically 0, 1 or 2 times.

In step 206, there is calculated, at least for part of the projection image pixels, the direction of the intensity gradient. According to the present invention, in the first round the direction of the intensity gradient is calculated for the whole projection image, but in later steps only for such projection image regions where images of fiducials are supposed to be found. By means of this procedure, processor power is saved and the process is speeded up without deteriorating the accuracy of the final detecting of the fiducial. According to a preferred embodiment of the invention, in step 206 there can also be calculated the magnitude of the intensity for various projection image pixels, but this procedure is optional and not necessary.

The gradient direction (derivative) of the intensity can, according to a preferred embodiment of the invention, be first estimated for each pixel under observation in the X and Y directions (horizontal and vertical directions), for instance by means of a Prewitt filter or alternatively a Sobel filter. According to a preferred embodiment of the invention, the direction of the intensity gradient is described for at least some pixels by means of a unit vector, by calculating the unit vector direction preferably on a circle arch, in the range $[0, 2\pi]$ and by scaling the direction values at the pixels advantageously either for the range $[0, 255]$ or $[0, 65\ 535]$ of the color space, in which case there is most advantageously obtained a gray shade image to describe the direction of the intensity gradient. It is pointed out that in order to present the unit vector, there are needed two gray shades per one pixel, i.e. for example two gray shade images, where the gradient is horizontal in one and vertical in the other.

In step 208 there are defined the most potential regions in the projection image, in which regions images of fiducials are expected to be found. Preferably the definition takes place by calculating for the obtained gray shade image describing the direction of the intensity gradient a correlation with a correlation kernel, such as for instance a circular or a toroid-shaped correlation kernel. According to a preferred embodiment of the invention, the employed correlation kernel is typically a sparsely sampled closed curve (a curve with for example 10-20 calculation points), such as a circle arch. Sparse sampling speeds up the calculation, but some accuracy is lost (the method is suited in a search carried out at a coarse image sharpness). A correlation kernel used according to another preferred embodiment of the invention is a toroid-shaped correlation kernel, and it is advantageously used in sharp projection images, when a better precision should be obtained. It is pointed out that with respect to sharpness, the best correlation kernel is said toroid-shaped correlation kernel. In the employed correlation kernel, such as a toroid-shaped correlation kernel, the gray shade scale is advantageously divided evenly between the values [0, 255] or [0, 65 535], starting from white and ending in black.

Similarity is calculated between images describing the correlation kernel and the directions of the gradient for instance by employing a normalized correlation, whereafter the value (correlation) describing the similarity between the correlation kernel and the image representing the gradient directions is compared with the threshold correlation value in order to accept or reject said location. In case the similarity value is at least as high as the threshold correlation, it can be assumed that an image of a fiducial is located at said point, and said point is analyzed during the next round. Otherwise the location is rejected, and it is not analyzed anymore.

In step 210, there are run morphologic operations for removing false correlation spikes and for reinforcing low correlation spikes. Preferably there is first run the erosion operation and thereafter the dilation operation. Then in step 212, there is estimated the need for repeating the process, and in case it is considered necessary (for example the locations of the fiducials are not yet detected sufficiently accurately, or there are detected too many of them), we move on to step 214, where new search locations are set. Otherwise we move on to step 220, and there is run a positioning analysis, and the result is given in step 222.

In step 214, there are set new search locations in the projection image on the basis of the previous round of the process. Search locations are defined in points where images of fiducials are supposed to be found on the basis of the performed correlation calculation. Moreover, in step 216 there are updated new values for parameters, such as for example the correlation threshold. There can also be updated values for other parameters, such as correlation kernel parameters, for instance then number of the pixels to be calculated, for which there is performed a sampling. As the resolution is first coarse, it is recommendable to use a sufficiently low correlation threshold in order to avoid losing the locations of potential images of fiducials. After increasing the resolution, the value of the correlation threshold can be raised. Other parameters can also be altered in similar fashion. Also the projection image resolution is scaled to be higher in step 218, prior to repeating the method, in order to improve the detecting accuracy of the images of the fiducials.

Thereafter we return to step 206, but now the direction of the intensity gradient is calculated only for the pixels of those regions where during the previous round, in steps 208 and 214, possible images of fiducials were presumed to exist. Now we continue by steps 208-218, until at some stage either the accuracy in detecting the images of fiducials is satisfactory, the user interrupts the function or the projection image resolution cannot be increased anymore, and we move on to step 220, where the calculation of the final location of the fiducials is performed, and thereafter to step 222, where the final result for the locations of the images of fiducials in the projection image is presented. The defining of the final location of the images of the fiducials is carried out for instance by calculating a weighted location average of a uniform local point surpassing the correlation limit. Another alternative way would be to arrange at the correlation spike a model, from which the point of the highest correlation value can be defined by calculating the zero point of the derivative. A roughly accurate location result is advantageously obtained by choosing for example the maximum point of a local correlation, which method can be applied in the earlier steps of the method 200.

It is pointed out that in the method 200, the gradient direction is preferably expressed by using the unit vector. When using the unit vector for expressing the direction of the gradient, correlations can be calculated separately for the x and y components of the vector, whereafter the results can be combined by means of a minimum function, so that the correlation of the vectors is the minimum of the component correlations.

Figure 3:
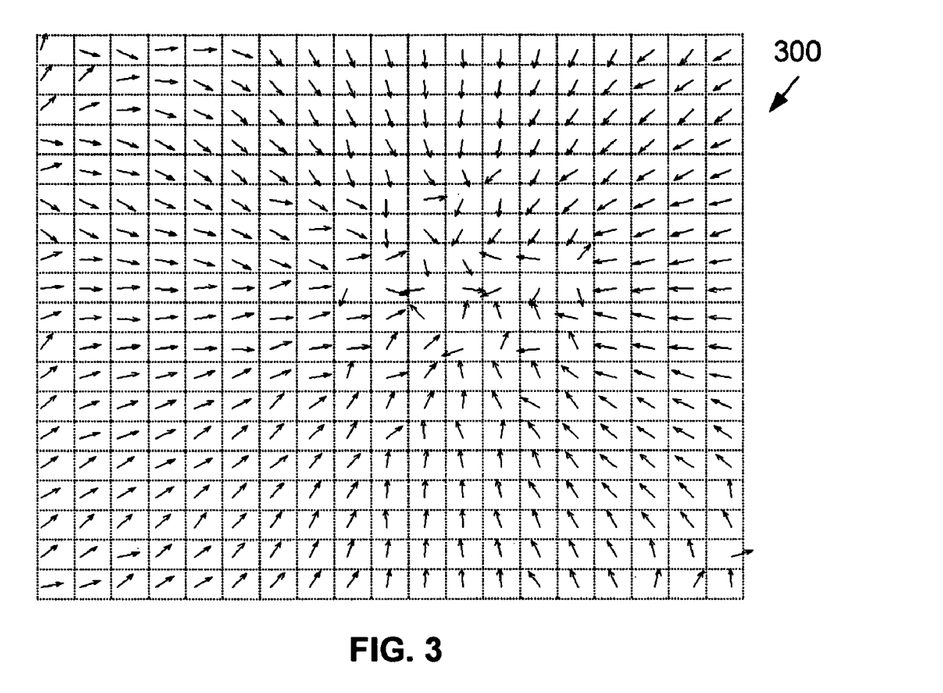
FIG. 3 illustrates an exemplary image of the intensity gradient vector at different pixels of the projection image according to the present invention.

FIG. 3 illustrates an exemplary image of the gradient vectors 300 of the intensity at different pixels of the projection image, according to the present invention. The intensity gradient vector is a vector that points towards the steepest climb of the intensity, and the length of which vector is comparable to the magnitude of the local change in the intensity.

Figure 4:
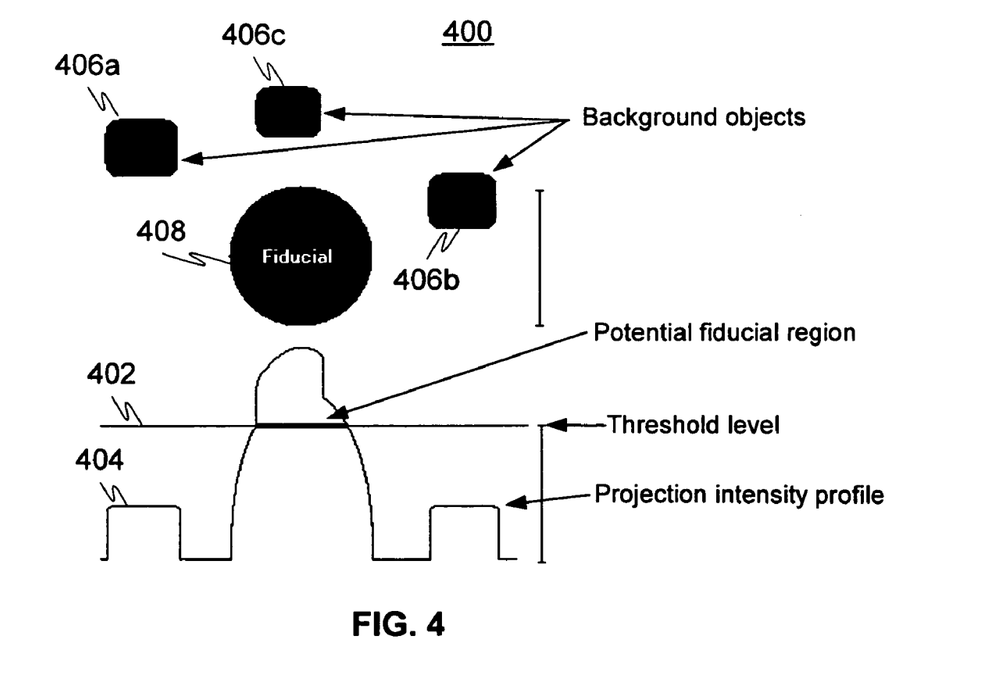
FIG. 4 is a diagram illustrating an exemplary method for setting the threshold value in order to detect a potential fiducial according to a preferred embodiment of the present invention.

FIG. 4 is a graph illustrating an exemplary method 400 for setting the threshold value 402 in order to detect a potential image of a fiducial, according to a preferred embodiment of the present invention. In FIG. 4, the curve 404 describes the intensity profile of the projection image at the detector, and it can be observed that the objects 406a, 406b located in the background absorb part of the radiation, which is seen in the intensity profile of the projection image as a local maximum (at these points of the detector, the radiation intensity used in the imaging has a minimum value). In the intensity profile of the projection image, there is particularly clearly distinguished the absorption of the fiducial 408, even if behind the fiducial 406, there still is located the object 406c.

In FIG. 4, the threshold value is set so that a mere object 406a-406c located in the background does not yet cause a sufficiently remarkable change in the intensity profile of the projection image, but there is needed the fiducial 408 made of a thicker material. Thus there can be avoided the spikes caused in the intensity profile of the projection image by background objects, such as various tissues, organs and bones, and it is possible to concentrate only in potential regions of the projection image. It should particularly be observed that the threshold value 402 can be raised or lowered depending for instance on the projection image resolution, exposure, background or the target to be imaged (does the target include a lot of bones, for example), fiducial material, thickness (transparency), shape, size and the quantum efficiency of the detector, the focal distance, the features of the employed X-ray radiation source, such as acceleration voltage (kV) and cathode current (mA).

Figure 5A:
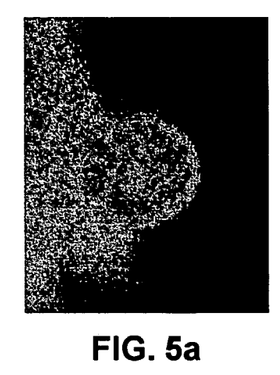
FIG. 5a illustrates an exemplary image of a fiducial in a projection image, according to the present invention.
Figure 5B:
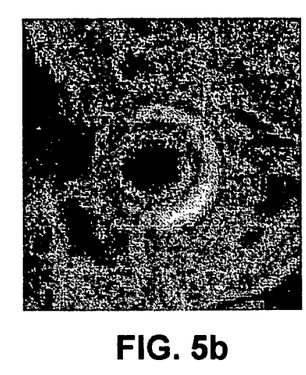
FIG. 5b illustrates an exemplary image of the intensity rates calculated for the projection image according to a preferred embodiment of the present invention.
Figure 5C:
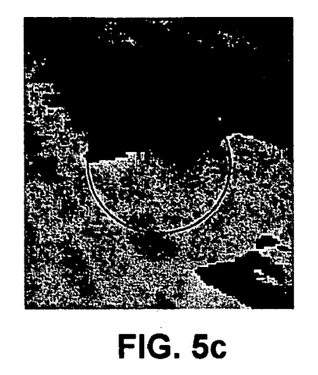
FIG. 5c shows an exemplary image illustrating the directions of the intensity gradient, according to a preferred embodiment of the present invention.

FIG. 5a illustrates an exemplary image taken by an X-ray imaging equipment of a fiducial in a projection image, according to the present invention. The image of the fiducial is seen in the projection image as lighter than the background that is more transparent for the wavelength of the applied radiation. In FIG. 5b, there is calculated the strength of the intensity gradient for the projection image comprising the image of the fiducial in FIG. 5a, and the result is presented, according to the strength, as different shades of gray. In addition, in FIG. 5c there is illustrated a figure describing the direction of the intensity gradients, where the direction of the gradient (values of the unit vectors) is shown as a gray shade image. It is particularly pointed out that when using a homogeneous spherical fiducial, the direction of the intensity gradient in the image of the fiducial points, at every location inside the image of the fiducial, towards the centroid of the image of the fiducial. For example at three o'clock, the gradient direction points to the left, and at nine o'clock, the gradient direction points to the right. The value of the direction depends on the choice of the coordinates.

Figure 6:
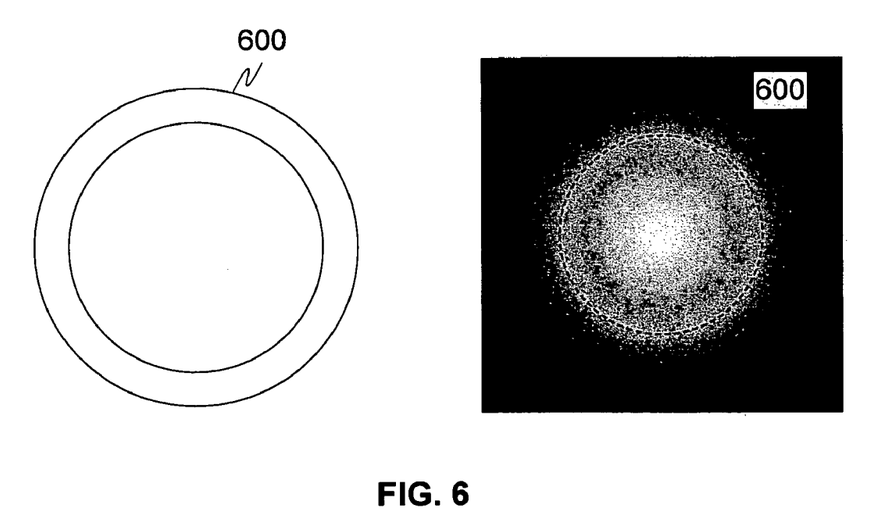
FIG. 6 illustrates an exemplary correlation kernel that is used for calculating the correlation according to a preferred embodiment of the present invention.

FIG. 6 illustrates an exemplary correlation kernel 600 that is used for calculating a correlation, according to a preferred embodiment of the present invention. The gray scale values of the correlation kernel are according to an example formed so that in a given direction, there is for example a completely white area, and the shade is darkened as the angle grows. In cases requiring special accuracy, the employed correlation kernel is preferably a toroid-shaped correlation kernel 600, the gray scale values of which are scaled for instance in the range [0, 255] or [0, 65 535] in order to correspond to a given value of the angle.

The gray scale values of a toroid-shaped correlation kernel at any chosen point of the toroid correspond to a direction of the intensity gradient of the image of the fiducial, expressed by the unit vector, which direction points towards the centroid of the image of the fiducial in the projection image. A toroid-shaped correlation kernel can be reduced towards the circular correlation kernel by changing the values of the radii $r_{max}$ and/or $r_{min}$, in which case the calculation of the correlation is made faster, but also coarser. However, the values of the radii must be chosen according to the invention so that the maximum of the intensity of the gradient of the image of the fiducial is located inside the image describing the correlation kernel.

In addition, it is pointed out that the correlation kernel can be made sparse, in which case the kernel only includes a few gray shade values, corresponding only to a few directions of the intensity gradient, so that also the calculation speed of the correlation is high, while the accuracy remains poor, or that the correlation kernel can be made very accurate, advantageously toroid-shaped, in which case the kernel includes a nearly continuous scale of different gray shades, corresponding to a very frequent sampling of the directions of the intensity gradient, so that the correlation calculation speed is low, and the accuracy high. It is yet pointed out that when using a unit vector for describing the directions of the intensity gradient, in order to describe the directions of the intensity gradient, in one projection image there are needed two gray shades, i.e. in one case two gray shade images (correlation kernels, advantageously toroids), by means of one the images there can be defined the correlation of the direction of the intensity in the horizontal direction, and by means of the other, there can be defined the correlation of the direction of the intensity in the vertical direction.

Figure 7:
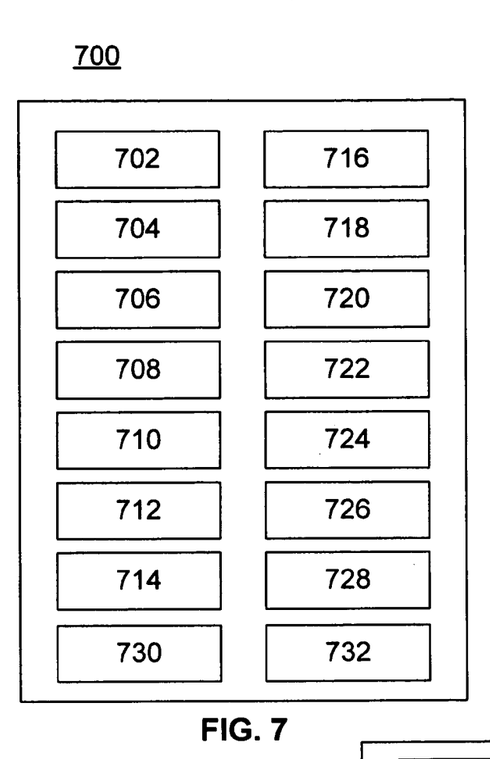
FIG. 7 is a block diagram illustrating an exemplary system for detecting the image of a fiducial in an X-ray projection image, according to a preferred embodiment of the present invention.

FIG. 7 is a block diagram illustrating an exemplary system 700 for detecting the image of a fiducial in a digital X-ray projection image, according to a preferred embodiment of the present invention, where the system 700 comprises means 702 for calculating the direction of the intensity gradient at least for part of the pixels in the digital projection image, means 704 for defining a region on the basis of the calculated directions of the intensity gradients in the projection image, where the direction of the intensity gradient is changed according to predetermined limits, and means 706 for defining a matching rate for how well the predetermined model describing the image of the fiducial matches the defined region.

Advantageously the system 700 also comprises means 708 for suggesting, as the location of the image of a fiducial, a location where the defined matching rate is at least as high as the predetermined threshold value. In addition, the system also typically comprises means 710 for scaling the values of the unit vector describing the directions of the intensity gradient to a gray shade image, so that a given gray shade corresponds to a given direction, means 712 for forming a correlation kernel having the shape of a circular arch and/or a toroid, where a given direction (for example in the horizontal and/or vertical directions) is described by a given shade of gray, and means 714 for calculating the correlation between the created correlation kernel and the regions of the gray shade image describing the directions of the intensity gradient.

The system may also comprise means 716 for suggesting, as the location of the image of a fiducial, a location where the calculated correlation is, in the region of the gray shade image describing the gradient directions, at least as high as the predetermined threshold value. According to an alternative preferred embodiment, the system may also comprise means 718 for calculating a normalized correlation for the directions of the intensity gradients on a predetermined circle arch with a given radius, in order to define the region of the projection image where the direction of the intensity gradient is changed according to predetermined limits, and means 720 for comparing the calculated, normalized correlations with the predetermined threshold value in order to select a location where the correlation is sufficiently high, and in order to suggest the location of the image of the fiducial in said location.

The system also comprises means 722 for calculating the location of the image of the fiducial in the projection image in several steps, so that before the first calculation of the direction of the intensity gradient, the system subjects the projection image to at least one of the following steps, where noise is eliminated by median filtering, and the spatial resolution of the projection image is scaled coarser. The system also comprises means 724 for scaling the spatial resolution of the projection image finer after calculating the direction of the intensity gradient, at least in part of those regions of the projection image, where the defined matching rate surpasses the predetermined limit, and where the location of the image of the fiducial is supposed to be found.

According to a preferred embodiment, the system also comprises means 726 for estimating the direction of the intensity gradient at a pixel of the projection image by using two Prewitt or Sobel filters at a 90-degree phase difference in the horizontal and vertical directions to pixels located around said pixel, as well as means 728 for calculating the direction of the intensity gradient at a pixel of the projection image by means of a unit vector.

Moreover, the system may comprise means 730 for calculating the location of the image of the fiducial, on the basis of a weighted average, in a region where the threshold value is surpassed, as well as means 732 for calculating the location of the image of the fiducial by applying the inserting of a function in an region where the threshold value is surpassed.

Figure 8:
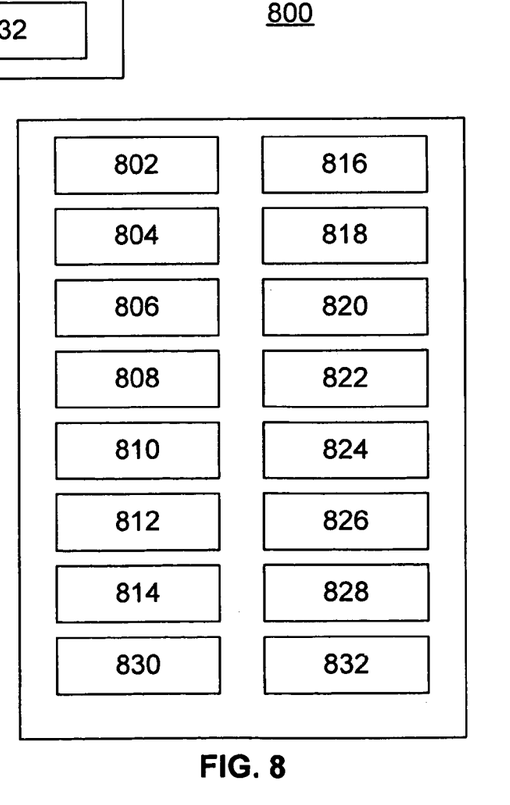
FIG. 8 illustrates an exemplary computer software product for detecting the image of a fiducial in an X-ray projection image, according to a preferred embodiment of the present invention.

FIG. 8 illustrates, by way of example, a computer software product 800 for detecting the image of a fiducial in a digital X-ray projection image, according to a preferred embodiment of the present invention, where the computer software product 800 comprises at least the following software components: a component 802 for calculating the direction of the intensity gradient for at least part of the digital projection image pixels, a component 804 for defining the area on the basis of the calculated directions of the intensity gradients in the projection image, where the direction of the intensity gradient is changed according to predetermined limits, and a component 806 for defining a matching rate for how well the predetermined model describing the image of the fiducial matches the defined area.

In addition, a software product may comprise the following software components, such as a component 808 in order to suggest, as the location of the image of a fiducial, a location where the defined matching rate is at least as high as the predetermined threshold value, a component 810 for scaling the values of the unit vector describing the directions of the intensity gradient shade into a gray shade image, so that a given shade of gray corresponds to a given direction, a component 812 for creating a correlation kernel having the shape of a circle arch and/or a toroid, where a given direction (for instance in the horizontal and/or vertical directions) is described by a given shade of gray, and a component 814 for calculating a correlation between the created correlation kernel and the areas of the gray shade image describing the directions of the intensity gradient.

Yet the software product may comprise the following software components, such as a component 816 for suggesting a location as the location of the image of a fiducial, in which location the calculated correlation is, in the area of the gray scale image describing the gradient directions, at least as high as the predetermined threshold value, a component 818 for calculating a normalized correlation for the directions of the intensity gradients on a predetermined circle arch with a given radius in order to define the area of the projection image, where the direction of the intensity gradient is changed according to predetermined limits, as well as a component 820 for comparing the calculated, normalized correlations with the predetermined threshold value in order to select a location with a sufficiently high correlation, and for suggesting the location of the image of a fiducial in said location.

The software product may also comprise the following software components, such as a component 822 for calculating the location of the image of the fiducial in the projection image in several steps, so that prior to the first calculation of the direction of the intensity gradient, the system processes the projection image in at least one of the following steps, where noise is eliminated by median filtering, and the spatial resolution of the projection image is scaled to be coarser; a component 824 for scaling the spatial resolution of the projection image finer, after calculating the direction of the intensity gradient at least in part of the areas of the projection image where the defined matching rate surpasses the predetermined limit, and where the location of the image of the fiducial is supposed to be found.

According to a preferred embodiment, a software product may also comprise the following software components, such as a component 826 for estimating the direction of the intensity gradient at a pixel of the projection image by using two Prewitt or Sobel filters at a 90-degree phase difference in the horizontal and vertical directions to pixels located around said pixel, as well as a component 828 for calculating the direction of the intensity gradient at the pixel of the projection image by means of a unit vector.

In addition, the software product may comprise a component 830 for calculating the location of the image of a fiducial, by means of a weighted average, in a region where the threshold value is surpassed, as well as a component 832 for calculating the location of the image of a fiducial, by employing the inserting of a function in a region where the threshold value is surpassed.

In the above specification, we have described only some preferred embodiments of the arrangement according to the invention. Naturally the principle according to the invention can be modified within the scope defined in the appended claims, for example as regards the details of the realization as well as the fields of application. In particular, the method can also be applied in other imaging operations than medical imaging. In addition it is pointed out that according to the general principle of the invention, there can also be used other filters than those mentioned in this document, and likewise other correlation kernels. It is particularly pointed out that the toroid-shaped correlation kernel used in the present publication approaches to the shape of a circular correlation kernel as the radii $r_{min}$ and $r_{max}$ approach each other, and to the kernel of the circle correlation as the radius $r_{min}$ approaches to zero. Moreover, it is pointed out that the directions of the intensity gradient can also be calculated by means of a tangent function instead of a unit vector. However, the use of a tangent function brings forth a problem, because the tangent function has a discontinuity point as the angle value changes from $2\pi$ to zero.

References:
[1] Heikkilä, Janne; Moment and Curvature Preserving Technique for Accurate Ellipse Boundary Detection, proc. 14$^{th}$International Conference on Pattern Recognition, Brisbane, Australia, 734-737.
[2] Vincze, Markus; Robust tracking of ellipse at frame rate, Pattern Recognition 34 (2001) 487-498

What is claimed is:

1. A method for detecting, in a digital projection image achieved by using penetrating radiation, the image of a fiducial, positioned in a target to be imaged, wherein the method comprises at least the following steps, where for at least part of the digital projection image pixels, there is calculated the direction of the intensity gradient, and on the basis of the calculated directions of the intensity gradients, there is defined a region in the projection image, where the direction of the intensity gradient changes according to predetermined limits, and there is defined a matching rate for how well the model describing the predetermined image of the fiducial matches the defined area.

2. A method according to claim 1, wherein in case the defined matching rate is at least as high as a predetermined threshold value, there is suggested, as the location of the image of the fiducial, said area in the projection image.

3. A method according to claim 1, wherein the direction of the intensity gradient at a pixel is expressed by means of a unit vector.

4. A method according to claim 3, wherein the directions of the intensity gradient, expressed by the unit vector, are scaled as a gray shade image so that for the direction of the intensity gradient in one projection image pixel, there are provided two corresponding gray shades, one of which describes the gradient in the horizontal direction, and the other describes the gradient in the vertical direction.

5. A method according to claim 4, wherein there is created a correlation kernel, where a given direction is described by a given gray shade, and there is calculated a correlation between the created correlation kernel and the components of the gray shade image describing the directions of the intensity gradient.

6. A method according to claim 5, wherein in shape, the correlation kernel is at least one of the shapes in the following group: a closed curve, a non-closed curve, a toroid, a circle arch, and an ellipse.

7. A method according to claim 5, wherein in case the calculated correlation is in one region of the gray shade image describing the directions of the gradient at least of the same magnitude as the predetermined threshold value, said region of the gray shade image describing the directions of the gradient is suggested as the location of the image of the fiducial.

8. A method according to claim 1, wherein for the directions of the intensity gradients, there is calculated a normalized correlation on a predetermined circle arch with a given radius in order to define the area of the projection image, where the direction of the intensity gradient is changed according to predetermined limits.

9. A method according to claim 8, wherein said circle arch is as sparse as possible with respect to the number of the points of calculation, such as a circle arch comprising 10 calculation points.

10. A method according to claim 8, wherein the calculated, normalized correlations are compared with the predetermined threshold value in order to select a location with a sufficiently high correlation, and in order to suggest the location of the image of the fiducial in said location.

11. A method according to claim 1, wherein the detecting of the image of the fiducial is carried out in several steps, and that prior to the first step described in claim 1, the projection image is subjected to at least one of the following process steps, where:
noise is eliminated by median filtering, and
the spatial resolution of the projection image is scaled to be coarser.

12. A method according to claim 11, wherein the projection image resolution is scaled to be finer after calculating the direction of the intensity gradient, at least in part of those projection image areas where the defined matching rate surpasses a predetermined limit, and where the location of the image of the fiducial is supposed to be found.

13. A method according to claim 1, wherein said digital projection image is a digital X-ray image.

14. A method according to claim 1, wherein the fiducial to be positioned in said target to be imaged is spherical in geometry, and that the thickness of the fiducial is essentially higher than the thickness of the object to be imaged.

15. A method according to claim 1, wherein the direction of the intensity gradient in the projection image pixel is estimated by using two Prewitt or Sobel filters at a 90-degree phase difference in the horizontal and vertical directions with respect to pixels located around said pixel.

16. A method according to claim 1, wherein the location of the image of the fiducial is calculated by means of a weighted average or by using the fitting of a function in a region where the defined matching rate is at least as high as a predetermined threshold value.

17. A system for detecting the image of a fiducial, positioned in a target, in a digital projection image achieved by using penetrating radiation, wherein the system is arranged to calculate, for at least part of the pixels of the digital projection image, the direction of the intensity gradient; to define, on the basis of the calculated directions of the intensity gradients, a region in the projection image where the direction of the intensity gradient changes according to predetermined limits; and to define a matching rate for how well a model describing the image of a fiducial matches the defined region.

18. A system according to claim 17 wherein in case the defined matching rate is at least as high as a predetermined threshold value, the system is arranged to suggest, as the location of the image of a fiducial, said region in the projection image.

19. A system according to claim 17, wherein the system is arranged to indicate the direction of the intensity gradient at a pixel by means of a unit vector.

20. A system according to claim 19, wherein the system is arranged to scale the directions of the intensity gradient detected by the unit vector to a gray shade image, so that for the direction of the intensity gradient at one pixel of the projection image, there are provided two shades of gray, one of which describes the gradient in the horizontal direction, and the other describes the gradient in the vertical direction.

21. A system according to claim 20, wherein the system is arranged to create a correlation kernel, where a given direction is described by a given gray shade, and to calculate a correlation between the created correlation kernel and the components of the gray shade image describing the directions of the intensity gradient.

22. A system according to claim 21, wherein in shape, said correlation kernel is at least one of the shapes in the following group: a closed curve, a toroid, a circle arch, and an ellipse.

23. A system according to claim 20, wherein in case the calculated correlation in the region of one gray shade image describing the directions of the gradient is at least of the same magnitude as the predetermined threshold value, the system is arranged to suggest the region of the gray shade image describing the directions of the gradient as the location of the image of the fiducial.

24. A system according to claim 17, wherein the system is arranged to calculate a normalized correlation for the intensities of the directions of gradients on a predetermined circle arch with a given radius in order to define the region of the projection image, where the direction of the intensity gradient changes according to predetermined limits.

25. A system according to claim 24, wherein the system is arranged to compare the calculated normalized correlations with a predetermined threshold value in order to select a location with a sufficiently high correlation, and in order to suggest the location of the image of a fiducial in said location.

26. A system according to claim 17, wherein the system is arranged to carry out the detecting of the image of the fiducial in several steps, and that the system is arranged to subject the projection image, prior to the first step set forth in claim 1, at least to one of the following process steps, where:
noise is eliminated by median filtering, and
the spatial resolution of the projection image is scaled to be coarser.

27. A system according to claim 26, wherein the system is arranged to scale the resolution of the projection image to be finer after calculating the direction of the intensity gradient, at least in part of the areas of the projection image, where the defined matching rate surpasses a predetermined limit, and where the location of the image of the fiducial is supposed to be found.

28. A system according to claim 17, wherein said digital projection image is a digital X-ray image.

29. A system according to claim 17, wherein said fiducial to be positioned in the target to be imaged is spherical in geometry, and that the thickness of said fiducial is essentially higher than the thickness of the target to be imaged.

30. A system according to claim 17, wherein the system is arranged to estimate the direction of the intensity gradient at a projection image pixel by employing two Prewitt or Sobel filters with a 90-degree phase difference both in the horizontal and in the vertical directions with respect to the pixels located around said pixel.

31. A system according to claim 17, wherein the system is arranged to calculate the location of the image of the fiducial by means of a weighted average or by using the fitting of a function in a region where the defined matching rate is at least as high as a predetermined threshold value.

32. A computer readable medium loadable in the memory of a computer, to be run there, wherein said computer readable comprises components for detecting, in a digital projection image achieved by using penetrating radiation, the image of a fiducial position on a target to be imaged, where for at least part of the digital projection image pixels, there is calculated the direction of the intensity gradient, and on the basis of the calculated directions of the intensity gradients, there is defined a region in projection image, where the direction of the intensity gradient changes according to predetermined limits, and there is defined a matching rate for how well the model describing the predetermined image of the fiducial matches the defined area, when said software product is run in the computer.

* * * * *